United States Patent

Nakanishi

[11] Patent Number: 5,815,880
[45] Date of Patent: Oct. 6, 1998

[54] CLEANING ROBOT

[75] Inventor: Hideaki Nakanishi, Ibaraki, Japan

[73] Assignee: Minolta Co., Ltd., Osaka, Japan

[21] Appl. No.: 689,278

[22] Filed: Aug. 6, 1996

[30] Foreign Application Priority Data

Aug. 8, 1995 [JP] Japan ................................ 7-202254

[51] Int. Cl.$^6$ ............................................... A47L 9/28
[52] U.S. Cl. ....................... 15/319; 15/340.1; 15/340.4; 15/354
[58] Field of Search ............................ 15/320, 319, 339, 15/340.1, 340.4

[56] References Cited

U.S. PATENT DOCUMENTS

| 3,942,215 | 3/1976 | Olds | 15/320 |
|---|---|---|---|
| 4,306,329 | 12/1981 | Yokoi | 15/319 |
| 4,782,550 | 11/1988 | Jacobs | 15/319 X |
| 4,907,316 | 3/1990 | Kurz | 15/319 |
| 5,284,522 | 2/1994 | Kobayashi et al. | 15/319 X |
| 5,309,592 | 5/1994 | Hiratsuka | 15/319 X |
| 5,440,216 | 8/1995 | Kim | 15/319 X |
| 5,568,589 | 10/1996 | Hwang | 15/319 X |
| 5,613,261 | 3/1997 | Kawakami et al. | 15/319 X |
| 5,634,237 | 6/1997 | Paranjpe | 15/319 |

FOREIGN PATENT DOCUMENTS

| 54-110663 | 8/1979 | Japan . |
|---|---|---|
| 5-61545 | 3/1993 | Japan . |
| 5-39455 | 5/1993 | Japan . |
| 5-204447 | 8/1993 | Japan . |

*Primary Examiner*—Chris K. Moore
*Attorney, Agent, or Firm*—Burns, Doane, Swecker & Mathis, LLP

[57] ABSTRACT

The robot according to the present invention sequentially performs a collecting operation in which dust and particles on the floor are collected, and a cleaning or waxing operation. The cleaning robot includes a moving unit including driving wheels or crawlers, a collecting unit for suctioning dust from the floor, and a wiping unit for wiping the floor with a detergent, disinfectant, wax, etc. The collecting unit is positioned on the front of the cleaning robot with respect to the moving direction while the wiping unit is positioned on the back of the cleaning robot. Thus, the robot prevents secondary contamination of the floor and slippage or failure of the moving means caused by soiling of the moving means. The cleaning unit and the wiping unit include sensors which sense an obstacle and determine whether the obstacle is one which can be moved over, such as a cord, or whether the obstacle is one which must be avoided, such as a wall.

19 Claims, 8 Drawing Sheets

CLEANING ROBOT

BACKGROUND OF THE INVENTION

1. Field of the Invention

The present invention relates to a working robot, specifically, a cleaning robot used for the purpose of floor cleaning.

2. Description of the Related Arts

In the area of conventional cleaning robots, a cleaning robot in which the dust suction inlet is fixed at a certain height in front of the wheels is shown in FIG. 1 of Japanese Laid-Open Patent Application No. Sho 54-110663. A cleaning robot in which the floor nozzle that suctions dust from the floor is fixed at a certain height at the back of the wheels has also been proposed and is shown in FIGS. 1 and 2 of Japanese Laid-Open Patent Application No. Hei 5-61545. A cleaning robot that is equipped with a washing unit that performs cleaning by rotating a rotary washing member while providing detergent, is shown in FIG. 1 of Japanese Laid-Open Patent Application No. Hei 5-204447.

However, using the conventional cleaning robots described above, in the case of the robot equipped with only a dust collecting means, it is not possible to remove dirt stuck to the floor or disinfect the floor. On the other hand, in the case of the robot equipped with a washing unit only, in areas where there is a lot of dust and other particles, this matter becomes dispersed by or entangled in the rotatable washing member, and moreover the rotatable washing member easily becomes soiled and damaged, requiring early replacement.

In addition, in any of the cleaning robots, the wheels, which are the moving means, may enter an area yet to be cleaned while the robot moves forward or backward or turns, in which case dust and particles may adhere to the contact surfaces of the wheels. This soiling of the contact surfaces of the wheels not only conversely contaminates areas already cleaned but also may cause reduction in frictional force of the wheels, causing slipping between the wheels and the floor, or may cause the dust to be caught in the moving means, causing failure.

Furthermore, if the cleaning means is fixed at a certain height, since the cleaning means is near or in contact with the floor, if there is an obstacle on the floor, the cleaning means may bump into the obstacle, thereby dragging it or getting entangled with it, even where the obstacle is relatively small, such as a cord. Where there is a step, slope, etc. on the floor, such a cleaning means prevents the cleaning robot from moving up the slope or over a small rise. The collecting and cleaning means of the prior art also hinder the movement of the cleaning robot when it moves without performing cleaning.

SUMMARY OF THE INVENTION

The object of the present invention is to provide a cleaning robot that sequentially performs a collecting operation in which dust and particles on the floor are collected, and a cleaning or waxing operation in which dirt on the floor is removed and the floor is disinfected, waxed, etc. and in which secondary contamination of the floor and slippage and failure of the moving means caused by the soiling of the contact surfaces of the moving means are prevented.

Another object of the present invention is to provide a cleaning robot that can move without the collecting means or cleaning means hindering the movement when the cleaning robot moves over an obstacle or moves without performing cleaning.

These object is obtained in a working robot comprising:
a main unit;
a moving unit which moves said main unit on a floor in a moving direction;
a collecting unit which is disposed at a front of the moving unit with respect to the moving direction of the main unit and collects dust on the floor; and
a wiping unit which is disposed at a rear of the moving unit with respect to the moving direction of the main unit and cleans the floor.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIGS. 4 (*a*) through (*m*) are bottom views respectively showing one example of a cleaning procedure of the robot when it is close to the wall, as well as cleaned areas;

DETAILED DESCRIPTION OF THE PREFERRED EMBODIMENTS

Embodiments of the present invention are explained below with reference to the drawings.

Figure 1:
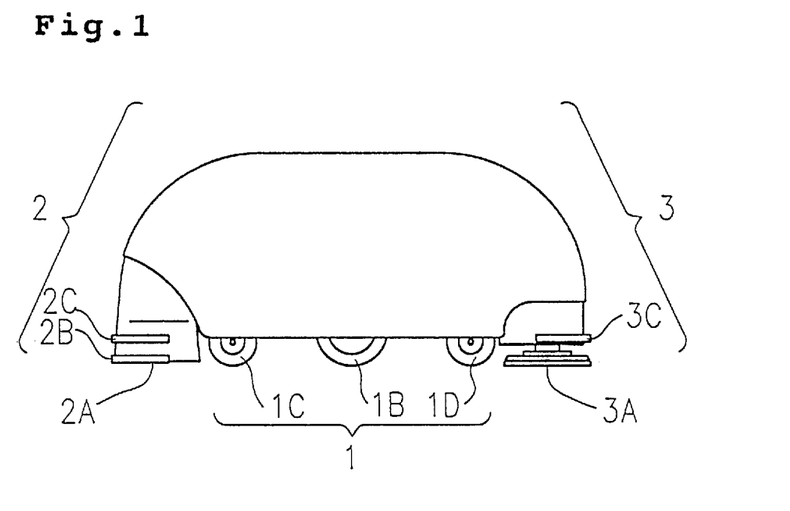
FIG. 1 is a side elevation of a robot according to a first embodiment of the present invention.
Figure 2:
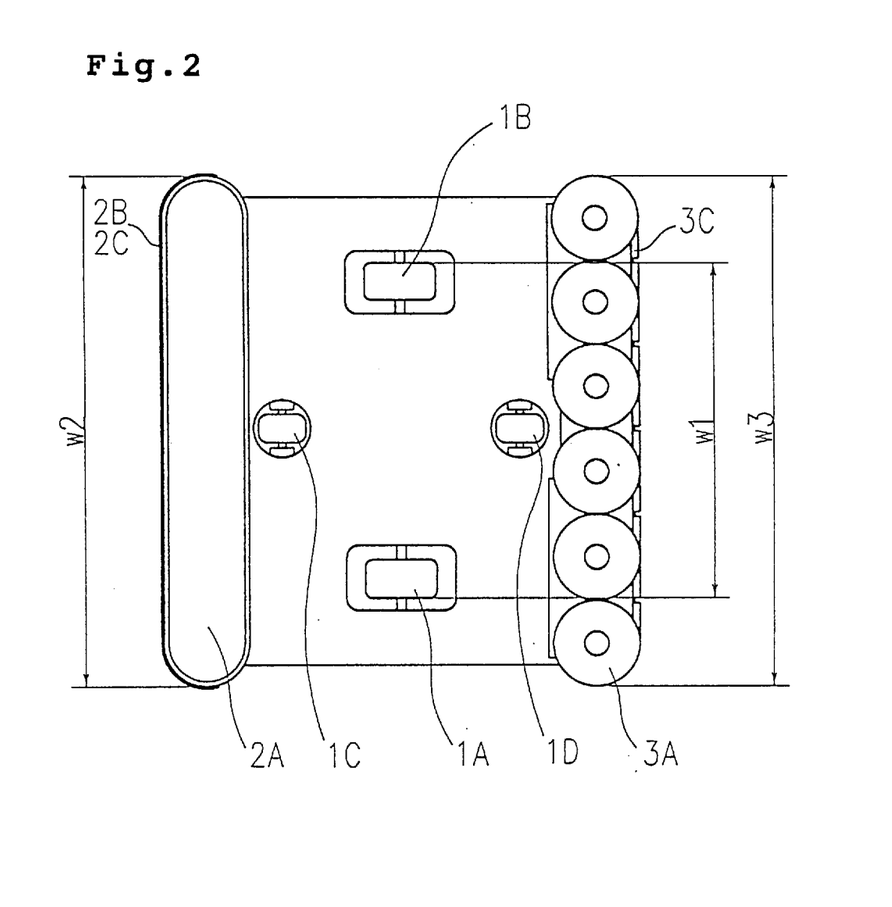
FIG. 2 is a bottom view of the robot according to the first embodiment of the present invention of FIG. 1.

FIG. 1 is a side elevation of a cleaning robot according to a first embodiment of the present invention (hereinafter called simply 'the robot') and FIG. 2 is a bottom view of said robot. This robot normally moves to the left in both FIG. 1 and FIG. 2.

First, the construction of this robot will be explained. The robot includes a moving unit 1 which moves the main unit, a collecting unit 2 for suctioning dust and particles on the floor into the main unit, and a wiping unit 3 for wiping the floor using detergent, disinfectant, wax, etc.

Moving unit 1 includes a right driving wheel 1A, a left driving wheel 1B, a front guiding wheel 1C, and a rear guiding wheel 1D. Right driving wheel 1A and left driving wheel 1B are driven independently of each other by motors not shown in the drawings. The right and left driving wheels 1A and 1B cause the main unit to move, as well as change the orientation of the main unit by changing the relative rotational speeds of the right and left driving wheels. Each driving wheel has a suspension mechanism (not shown in the drawings) that allows it to maintain contact with the floor even if there are bumps, dips or steps on the floor. Front guiding wheel 1C and rear guiding wheel 1D are located along the center line of the main unit, as shown in FIG. 2, and the orientations of the guiding wheels are actively changed by actuators (not shown in the drawings) in accordance with the radial gyration of the main unit.

Collecting unit 2 is attached to the front end of the main unit, and includes suction inlet 2A, a lower contact sensor 2B and an upper contact sensor 2C. Suction inlet 2A is used to suction dust and particles into the main unit using suction force generated by a fan (not shown in the drawings) placed in the main unit. The functions of lower contact sensor 2B and upper contact sensor 2C are described below.

Wiping unit 3 is attached to the rear end of the main unit, and includes multiple rotatable members 3A, a lower contact sensor 3B (shown in FIG. 8) and upper contact sensor 3C. Rotatable members 3A are constructed with a lower part which comes into contact with the floor formed of a soft material such as sponge or non-woven fabric or a brush, and with an upper part covering the soft part formed of a hard material such as plastic. The hard part allows the rotatable member 3A to be pressed against the floor with a uniform pressure. Rotatable members 3A are laterally aligned along a single line with no gaps between them. A pierced hole is present in the center of each rotatable member 3A, such that a cleaning solution such as detergent or disinfectant or a waxing solution is dropped through said pierced hole onto the floor. The cleaning solution or waxing solution is stored in a tank in the main unit (not shown in the drawings) and is sent out from this tank when necessary via a supply mechanism such as a pump (not shown in the drawings).

The cleaning or waxing solution is spread on the floor using this construction. Rotatable members 3A rotate in the direction opposite to the direction of their adjacent rotatable members 3A at the same speed so that wear due to friction with one another may be prevented. The functions of lower contact sensors 3B and upper contact sensors 3C are described below.

These moving unit 1, collecting unit 2 and wiping unit 3 are constructed such that the following condition (1) is met with regard to a distance w1 between the right end of right driving wheel 1A and the left end of left driving wheel 1B, a width w2 of suction inlet 2A that extends along the width of the main unit, and a width w3 of the group of rotatable members 3A that also extends along the width of the main unit (see FIG. 2).

$$w1 < w3 \leq w2 \qquad (1)$$

Consequently, when the robot moves straight ahead, collecting unit 2 at the front end of the main unit first collects dust and particles in width w2, and then wiping unit 3 at the rear end of the main unit removes dirt sticking to the floor and disinfects the floor in width w3 which is the same width as or narrower than the width of the area in which dust collection has been performed. In this way, a series of cleaning processes are performed at once. Further, since wiping unit 3 only passes an area in which dust collection has already been performed by collecting unit 2, contamination and damage to rotating members 3A can be prevented.

In addition, since the contact surfaces of right and left driving wheels 1A and 1B move at all times only within the area in which dust collection has already been performed, adherence of dust and particles to driving wheels 1A and 1B can be minimized. Conversely, even if the floor becomes soiled from the contact surfaces of driving wheels 1A and 1B, wiping unit 3 wipes the area where driving wheels 1A and 1B have passed, and as a result the soiling can be removed to the extent possible.

Moreover, if the robot should need to return to an area that has not been cleaned at all, the contact surfaces of driving wheels 1A and 1B pass within an area which has been wiped, and therefore the wheels do not become easily soiled.

The movement of the robot when it turns will now be explained.

Figure 3:
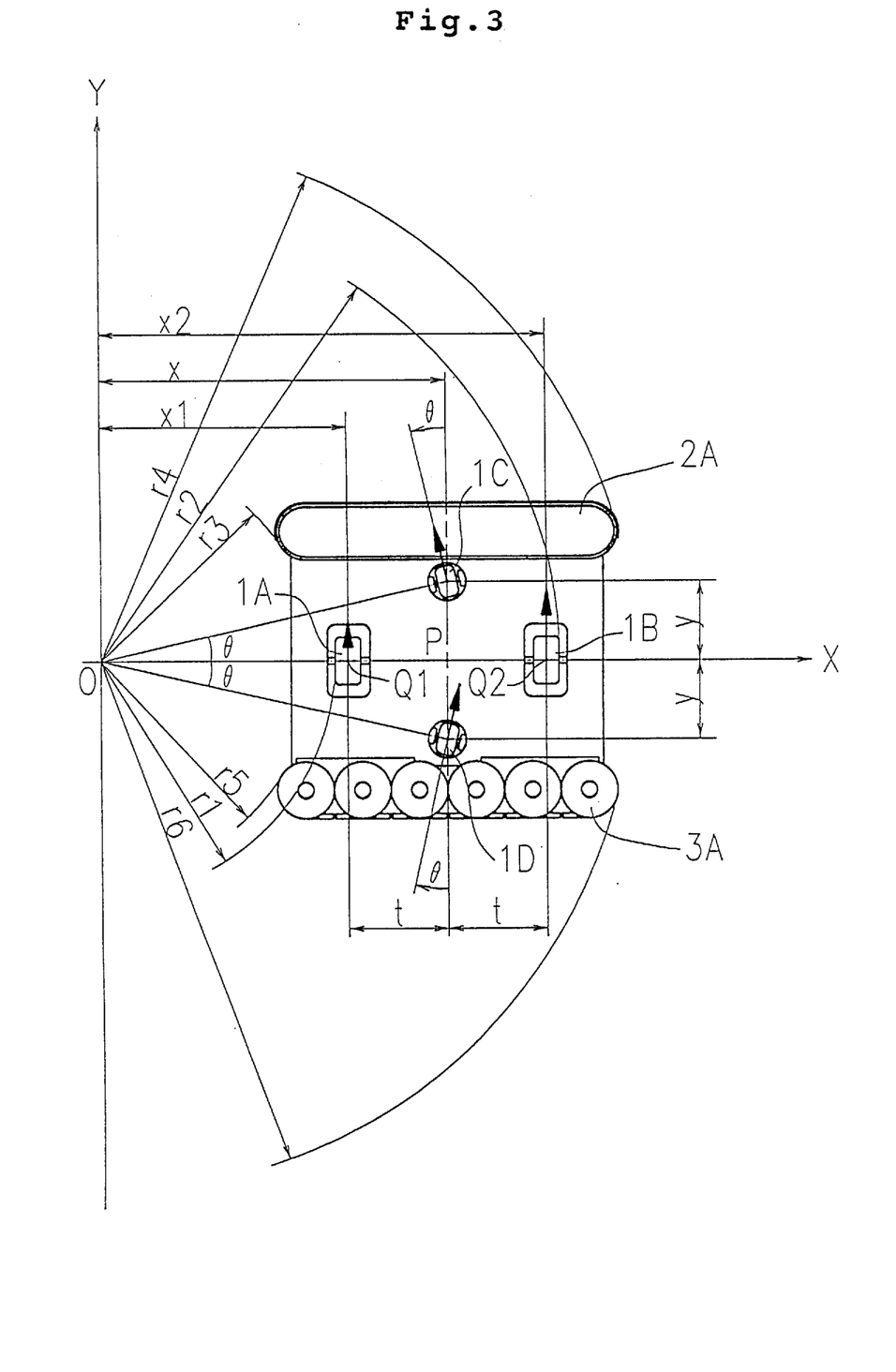
FIG. 3 is a bottom view of the robot of FIG. 1 when it is turning.

FIG. 3 is a bottom view of the robot when it is turning. The centers of gravity of the contact surfaces of the respective wheels are defined as the wheel contact points. In other words, the contact points of the two driving wheels 1A and 1B are deemed Q1 and Q2, respectively. Center of gyration O while the robot turns is deemed the origin, the line connecting point O and points Q1 and Q2 is deemed the X axis and the line passing through origin O and perpendicular to the X axis is deemed the Y axis, and X-Y coordinates are obtained. If the number of rotations of right driving wheel 1A is v1, the number of rotations of left driving wheel 1B is v2, their ratio v2/v1 is v, the distance between driving wheel contact points Q1 and Q2 is 2t, the distance between center of gyration O and point Q1 is x1, the distance between center of gyration O and point Q2 is x2 and the radius of gyration of the robot (in other words, the distance between center of gyration O and the point P that is equidistant from and between the two driving wheel contact points Q1 and Q2) is deemed x, the following equation holds true.

$$\begin{aligned} v &= v2/v1 \\ &= x2/x1 \\ &= (x+t)/(x-t) \end{aligned} \qquad (2)$$

Therefore, the following equation is obtained.

$$x = \{(v+1)/(v-1)\} \cdot t \qquad (3)$$

As can be seen from this equation (3), radius of gyration x changes depending on ratio v between the numbers of rotations v1 and v2.

Radius of gyration x and the direction of turning of the robot are determined not only by number of rotations ratio v but also by the orientations of guiding wheels 1C and 1D. As shown in FIG. 3, when the robot turns, guiding wheels 1C and 1D change their orientations in opposite directions but by the same angle θ relative to the center line of the main unit. If the distance between point P and the contact points of guiding wheels 1C and 1D is y, and the degree of turn of front guiding wheel 1C or rear guiding wheel 1D with regard to the center line of the main unit is θ, the following equation holds true.

$$\theta = \tan^{-1}(y/x) \qquad (4)$$

Therefore, in order to turn the robot with radius of gyration x, driving wheels 1A and 1B and guiding wheels 1C and 1D should be controlled such that the values of v and θ obtained via equations (2) and (4) may be realized.

In addition, where the smaller distance value and the larger distance value between center of gyration O and the driving wheel contact surfaces are deemed r1 and r2, the smaller line segment value and the larger line segment value connecting center of gyration O and the circumference of suction inlet 2A are deemed r3 and r4, and the smaller line segment value and the larger line segment value connecting center of gyration O and the circumference of the group of rotatable members 3A are deemed r5 and r6, respectively, moving unit 1, collecting unit 2 and wiping unit 3 are constructed such that the following conditions are met.

$$r1 > r5 \geq r3 \tag{5}$$

$$r2 < r6 \leq r4 \tag{6}$$

If conditions (5) and (6) are met, the robot can perform the cleaning operation described above that it performs when it moves straight ahead and while it is turning as well. In other words, when the robot moves straight ahead, wiping unit 3 performs wiping without leaving the area in which dust collection has been completed and the contact surfaces of driving wheels 1A and 1B do not leave the area in which dust collection has been completed. When the robot moves backward, the contact surfaces of driving wheels 1A and 1B pass through the area which has been wiped, and therefore they do not easily become soiled.

As a preferred construction, for example, the outer configurations of suction inlet 2A and the group of rotatable members 3A seen from the bottom of the main unit as shown in FIGS. 2 and 3 should be approximately the same in the X directions at both ends, while the Y direction widths of suction inlet 2A and of the group of rotatable members 3A should be equal, and suction inlet 2A and the group of rotatable members 3A should be located at positions which are symmetrical relative to the X axis. Using such a construction, if radius of gyration x is a certain value or larger, both conditions (5) and (6) are met when the robot turns. Further, the operation described above can be performed when the robot moves straight ahead as well. When the robot performs cleaning along a wall, both dust collection and wiping can be performed right up to the edge of wall.

However, in the case of this construction, if radius of gyration x decreases, condition (5) is not longer met (r1>r5 becomes no longer true). Therefore, distance w1 between the driving wheels is set such that conditions (5) and (6) are met at the smaller radius of gyration during actual movement, and movement of the robot is controlled such that the movement occurs in the range where conditions (5) and (6) are met.

Figure 4:
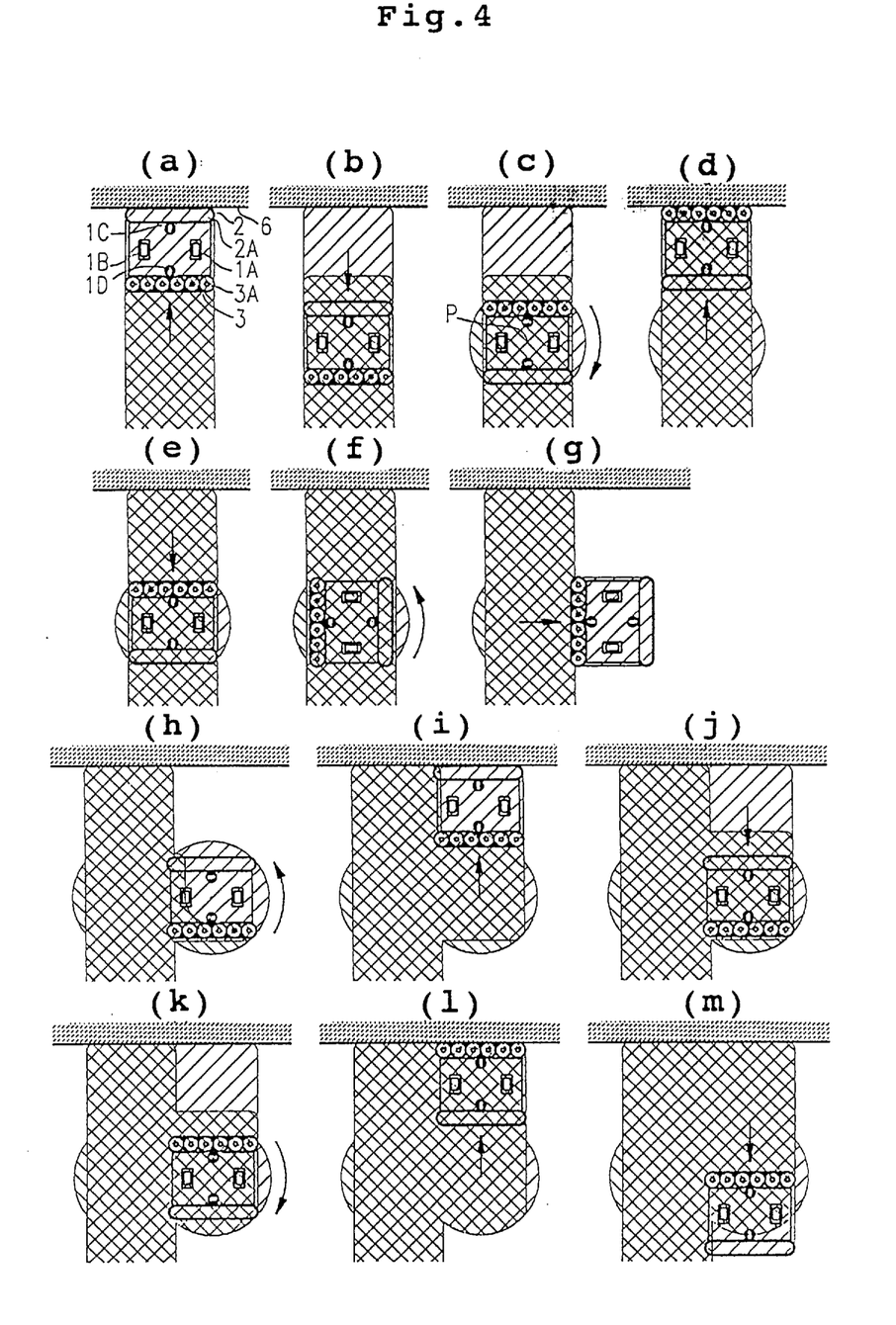

FIG. 4 is one example of the cleaning procedure performed when the robot approaches the wall and moves to the neighboring yet-to-be cleaned area to continue cleaning. Width w2 of suction inlet 2A and width w3 of the group of rotatable members 3A are the same in FIG. 4 as in the other figures.

According to the procedure of FIG. 4, first after the robot moves straight ahead until collecting unit 2 comes into contact with wall 6 (FIG. 4(a)). Then it moves backward to a position at which it does not come into contact with wall 6 when it turns 180 degrees in the next step (FIG. 4(b)). The robot then turns right by 180 degrees with the point equivalent to point P in FIG. 3 as the center of rotation and reverses its front and back positions (FIG. 4(c)). Since it is preferred that the group of rotatable members 3A not, to the extent possible, leave the area in which dust collection has been completed in order to prevent contamination and damage while the robot turns, the width of the robot main unit is larger than its length. It is also acceptable to have width w2 of suction inlet 2A be larger than width w3 of the group of rotatable members 3A as shown in condition (1). However, as long as the area to the left of the robot in the drawing has already been cleaned, even if rotatable members 3A enter this area, rotatable members 3A do not become contaminated or damaged.

The robot then moves backward until wiping unit 3 comes into contact with wall 6 (FIG. 4(d)). At this point, one session of cleaning is completed in the area whose width equals width w3 of the group of rotatable members 3A. The robot then moves forward and returns close to the position at which it turned 180 degrees in FIG. 4(c) (FIG. 4(e)).

At this position, the robot turns to the left by 90 degrees with point P as the center of rotation and the robot faces to the right in the drawing (FIG. 4(f)). It then moves forward over a distance equal to or smaller than the width of the area which has been cleaned (FIG. 4(g)). In actuality, because of errors due to slippage, etc., of driving wheels 1A and 1B, the robot may move somewhat off the theoretical route. In this event, if the distance over which the robot moves forward in FIG. 4(g) is made equal to the width of the area which has been cleaned, a strip of uncleaned area may result between neighboring cleaned areas. Therefore, it is preferred that the distance over which the robot moves forward in FIG. 4(g) is shorter than the width of the area which has been cleaned, such that neighboring cleaned areas overlap by a prescribed width.

The robot then turns left by 90 degrees with point P as the center of rotation and faces wall 6 (FIG. 4(h)), after which the robot moves forward until it comes into contact with wall 6 again (FIG. 4(i)). It then moves backward over a distance equal to or smaller than the travel distance in FIG. 4(e) (FIG. 4(j)). The robot then turns right by 180 degrees with point P as the center of rotation and reverses its front and back positions (FIG. 4(k)). When this is done, since the area to the left of the main unit in the drawing is already cleaned, even if rotatable members 3A enter it, they do not become contaminated or damaged. The robot then moves backward until wiping unit 3 comes into contact with wall 6 (FIG. 4(l)). The robot then moves forward and begins cleaning the uncleaned area adjacent to the area that has been cleaned. (FIG. 4(m)). The robot continues cleaning by repeating the same operation each time it reaches a wall or other obstacle.

Equations (2), (3) and (4) described above hold true for the rotating movement in FIG. 4 as well. In other words, since the rotating movement in FIG. 4 is equivalent to a case of turning movement in which the radius of gyration x is 0, control should be exerted such that the number of rotations ratio v between driving wheels 1A and 1B is −1 and the angle θ of front guiding wheel 1C or rear guiding wheel 1D as to the center line of the main unit is π/2.

Figure 5:
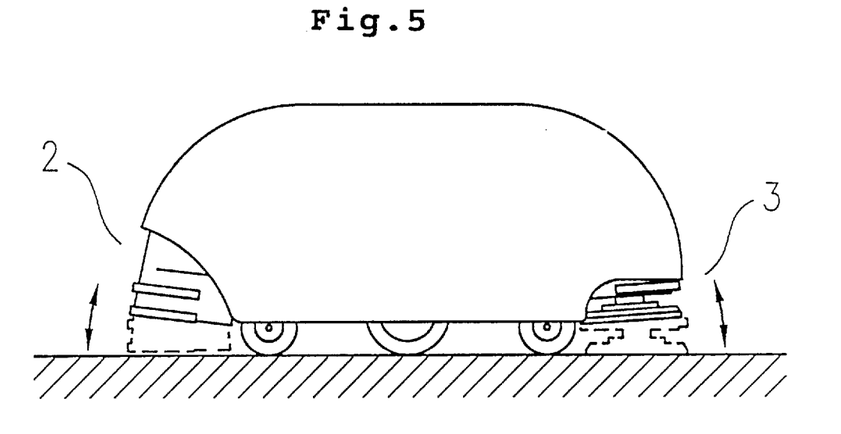
FIG. 5 is a side elevation showing the lifting and lowering of the collecting unit and the wiping unit by means of lifting mechanisms.

FIG. 5 shows an example of a lifting operation performed by means of lifting mechanisms 4 (details are described below) of collecting unit 2 and wiping unit 3. Where the robot has come into contact with an obstacle, step, slope, etc., even if the height of the obstacle, etc. is under a level that moving unit 1 can move over, the obstacle, etc. may come into contact with collecting unit 2 or wiping unit 3 and an excessive burden may be inflicted on the robot. In such a case, collecting unit 2 and wiping unit 3 are lifted to a height at which they can avoid coming into contact with the obstacle, etc. to prevent an excessive burden from being inflicted on the robot. Lifting mechanisms 4 have a mechanism that raises collecting unit 2 and wiping unit 3 into the main unit away from the object (obstacle, step, slope, etc.) and that lowers them along the same routes.

Figure 6:
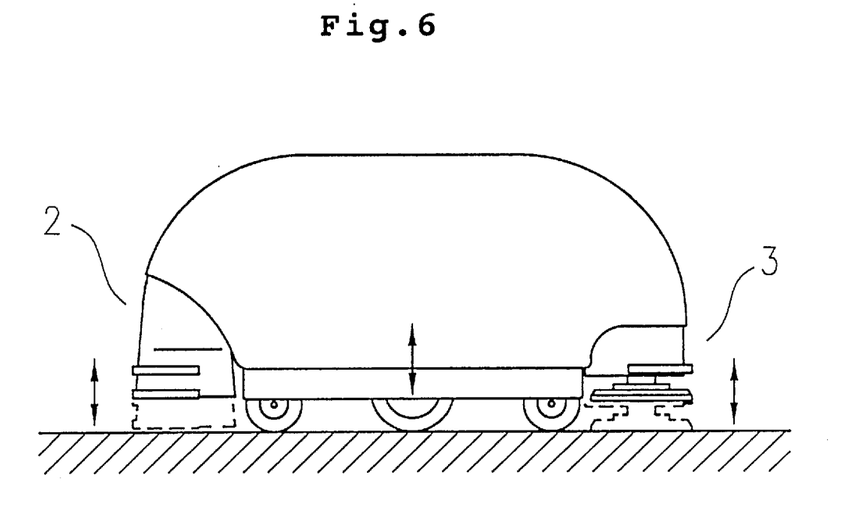
FIG. 6 is a side elevation showing the lifting and lowering of the collecting unit and the wiping unit by means of a lifting mechanism according to an alternative embodiment.

While collecting unit 2 and wiping unit 3 move up and down independent of each other, a construction in which they are lifted and lowered simultaneously may be used by using one actuator for lifting mechanisms 4. Since the distances necessary to lift collecting unit 2 and wiping unit 3 to avoid an obstacle are the same, the construction may be such that collecting unit 2 and wiping unit 3 are linked and lifting mechanism 4 raises and lowers the structure to which said both members are attached (details are described below), as shown in FIG. 6.

When a robot makes a turn in the manner shown in FIG. 4, if wiping unit 3 is lifted through the operation of lifting mechanism 4, wiping unit 3 does not wipe areas in which dust collection has not been performed. Therefore, contamination and damage of rotatable members 3A can be prevented.

The functions of lower contact sensor 2B and upper contact sensor 2C located on collecting unit 2 will now be explained.

Figure 7:
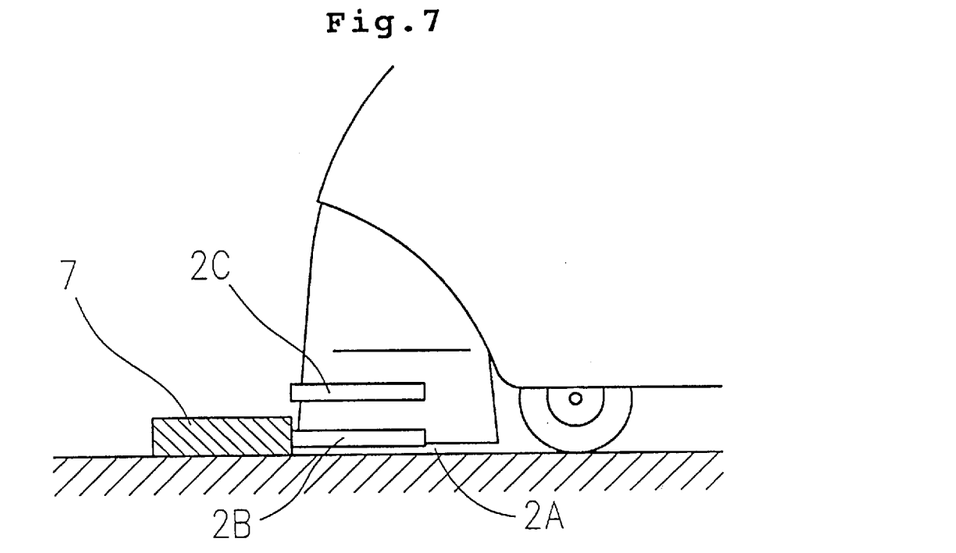
FIG. 7 is an enlarged side elevation showing the robot's collecting unit in contact with an obstacle.

FIG. 7 shows collecting unit 2 in contact with an obstacle 7. Lower contact sensor 2B and upper contact sensor 2C are located at positions at which they operate simultaneously when they come into contact with a wall perpendicular to the floor. Lower contact sensor 2B is attached to the bottom end of suction inlet 2A and upper contact sensor 2C is attached at a height at which it reacts to an obstacle having at least the minimum height that moving unit 1 cannot move over.

As shown in FIG. 7, where lower contact sensor 2B detects obstacle 7 and upper contact sensor 2C has no reaction, it is determined that the robot can move over obstacle 7, and lifting mechanism 4 operates to lift collecting unit 2 and wiping unit 3 by a prescribed distance, whereupon the robot enters a 'move-over' operation. However, when lower contact sensor 2B detects an obstacle while the robot is already moving over an obstacle, it is determined that the robot cannot move over the obstacle, whereupon the robot moves backward or turns around and enters an 'avoid' operation. On the other hand, where upper contact sensor 2C detects an obstacle, it is determined immediately that the robot cannot move over the obstacle, whereupon the robot moves backward or turns around and enters the 'avoid' operation.

The movements of FIGS. 4(a) and 4(i) shown above are one example of the procedure described above where the upper contact sensor 2C detects an obstacle. The robot moves forward until lower contact sensor 2B and upper contact sensor 2C detect wall 6 (i.e., until the sensors come into contact with wall 6).

Contact sensors 2B and 2C comprise multiple sensor elements and are mounted on the main unit along its width, as shown in FIG. 2, and can detect the position and orientation of an obstacle from the contact sensor element that reacts to the obstacle. Therefore, the robot can select the appropriate 'avoid' operation.

The functions of lower contact sensor 3B and upper contact sensor 3C located on wiping unit 2 will now be explained.

Figure 8:
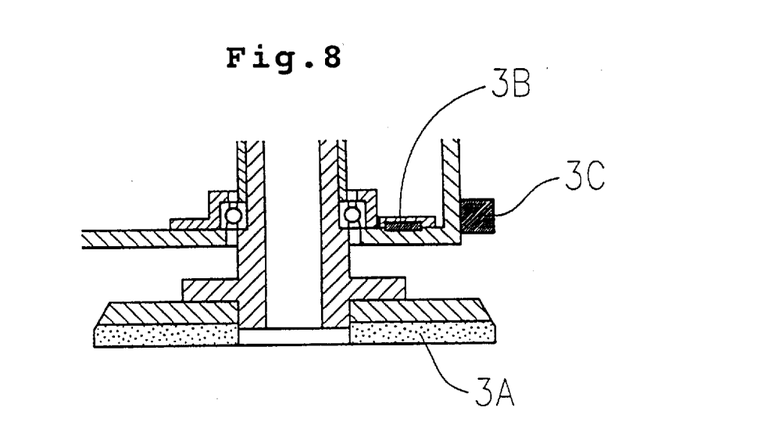
FIG. 8 is an enlarged vertical cross-sectional view of the robot's wiping unit cut along the central axis of any one of the rotary members.

FIG. 8 shows an enlarged vertical cross-sectional view of wiping unit 3 cut along the center axis of any of the rotatable members 3A. Lower contact sensor 3B comprises a distortion gauge, etc. Rotatable member 3A has a construction in which its mounting unit is easily deformed when rotatable member 3A comes into contact with an obstacle. Therefore, when rotatable member 3A comes into contact with an obstacle, a distortion occurs in the part at which lower contact sensor 3B is mounted, and the obstacle is perceived by lower contact sensor 3B, detecting this distortion.

Preferably, a plurality of lower contact sensors 3B are mounted at positions close to the holding unit of each rotatable member 3A, so that when in contact with an obstacle, the location and direction of the obstacle can be detected.

Upper contact sensor 3C is mounted at the same height as upper contact sensor 2C of the collecting unit. Because upper contact sensor 3C also comprises multiple sensor elements, the position and orientation of an obstacle can be detected from the sensor element that reacts to the obstacle. Upper contact sensor 3C is located at a position at which it can operate at the same time as lower contact sensor 3B when it comes into contact with a wall perpendicular to the floor. The operations to avoid or move over an obstacle contacted by the contact sensors 3B and 3C are the same as when the robot moves forward.

In other words, when lower contact sensor 3B detects obstacle 7 but there is no reaction from upper contact sensor 3C, it is determined that the robot can move over the obstacle, whereupon lifting mechanism 4 operates to raise collecting unit 2 and wiping unit 3 by a prescribed distance and the robot begins the 'move-over' operation. However, when lower contact sensor 3B detects the obstacle while the robot is moving over it, it is determined that the robot cannot move over the obstacle, whereupon the robot moves backward or turns around and begins the 'avoid' operation. On the other hand, when upper contact sensor 3C detects an obstacle, it is determined immediately that the robot cannot move over the obstacle, whereupon the robot moves backward or turns around and begins the 'avoid' operation.

The movements of FIGS. 4(d) and 4(l) described above are one example of the procedure described above. The robot moves backward until lower contact sensor 3B and upper contact sensor 3C detect wall 6 (i.e., until the sensors come into contact with wall 6).

Contact sensors 2B, 2C and 3C may be replaced with non-contact sensors equipped with a light emitting unit and a light receiving unit, passive auto focus (AF) sensors, etc.

A robot pertaining to a second embodiment will now be explained.

Figure 9:
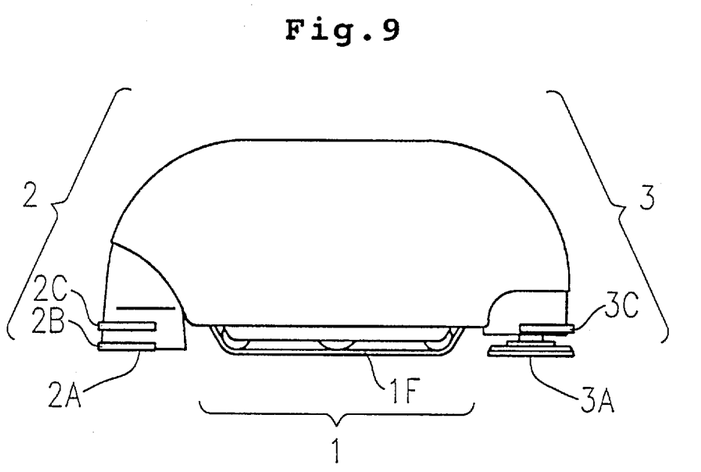
FIG. 9 is a side elevation of a robot according to a second embodiment of the present invention.
Figure 10:
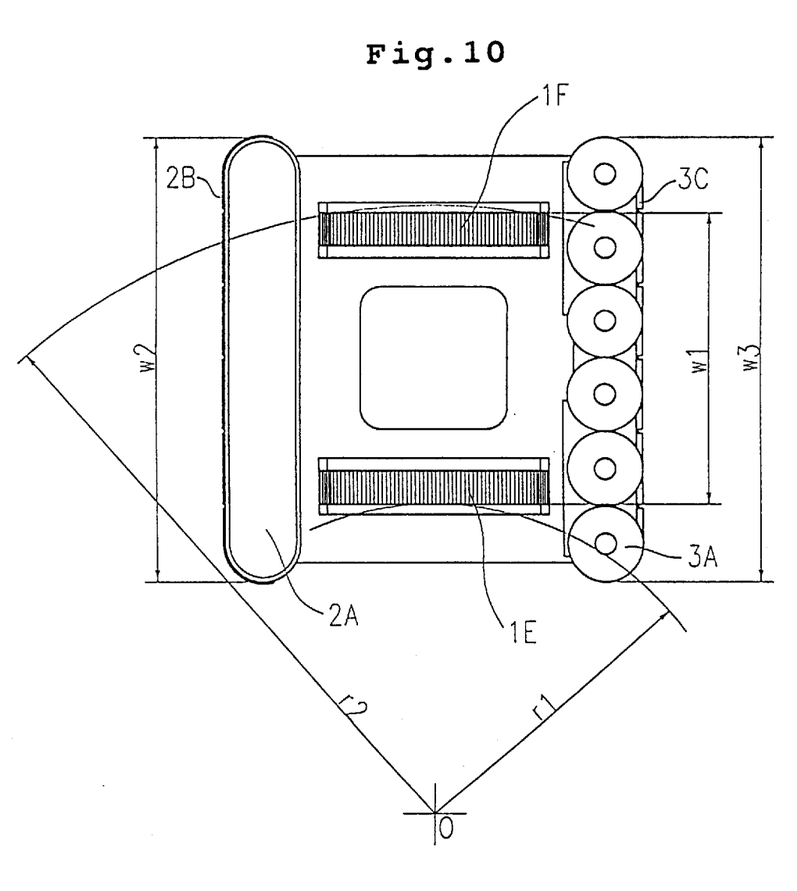
FIG. 10 is a bottom view of the robot according to the second embodiment of the present invention.

FIG. 9 is a side elevation of the robot pertaining to the second embodiment and FIG. 10 is a bottom view of said robot. This second embodiment of the robot normally moves to the left in FIGS. 9 and 10.

In this embodiment, a pair of crawlers, i.e., right crawler 1E and left crawler 1F, is used for moving unit 1. Except for this moving unit 1, the robot of this embodiment has the same construction as the robot of the first embodiment described above, and therefore the same reference numbers used in the first embodiment are used for components other than moving unit 1 and their explanations will be omitted.

If distance w1 between the right edge of right crawler 1E and the left edge of left crawler 1F and smaller distance value r1 and larger distance value r2 between center of gyration O and the crawler contact surfaces during turning meet conditions (1), (5) and (6) shown above, the contact surfaces of the two crawlers 1E and 1F do not enter areas in which dust collection or wiping have not been performed when the robot moves straight ahead or turns around, as in the case of the robot shown in the first embodiment that moves using wheels. Therefore, since crawlers 1E and 1F can be prevented from becoming soiled, secondary contamination of cleaned areas, as well as a reduction in the frictional force of crawlers 1E and 1F, occurrences of failure, etc., can be controlled.

However, in terms of their construction, while crawlers can move straight ahead more efficiently than wheels, most of the contact surfaces slip laterally during turning, which gives rise to a larger loss of energy, and as a result of differences in frictional force among different parts of the contact surface due to wear and soiling of the crawler and irregularities in the floor, the location of the center of rotation can easily vary. As a result, control of crawlers during turning is more difficult than for wheels, and it is difficult, for example, to accurately carry out the movements shown in FIG. 4.

Figure 11:
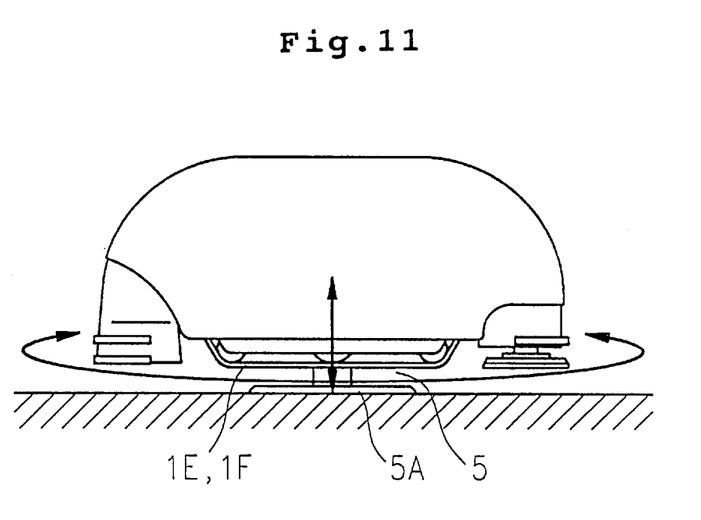
FIG. 11 is a side elevation of the robot of the second embodiment with its orientation changing mechanism in operation.

Therefore, orientation changing mechanism 5 is positioned centrally at the bottom of the robot main unit as shown in FIG. 11. This orientation changing mechanism 5 lifts the robot main unit to a prescribed height when the robot turns, such that crawlers 1E and 1F are lifted away from the floor. It then rotates the main unit by a prescribed degree and lowers it again to the original height.

Orientation changing mechanism 5 is equipped with leg 5A. Leg 5A is housed in a position that is between the crawlers and away from the floor during normal movement. When the robot turns, leg 5A is lowered out of orientation changing mechanism 5 when moving unit 1 has stopped, such that it is planted on the floor to raise, rotate and lower the main unit. This construction improves the accuracy of rotation and eliminates loss of energy due to slippage of the contact surfaces of the crawlers, which makes it possible to reduce the drive force. Where movements as shown in FIG. 4 are carried out in particular, orientation changing mechanism 5 should be located such that it is at a position equivalent to point P in FIG. 3.

Lifting mechanisms 4 of collecting unit 2 and wiping unit 3 described above will be explained.

Figure 12:
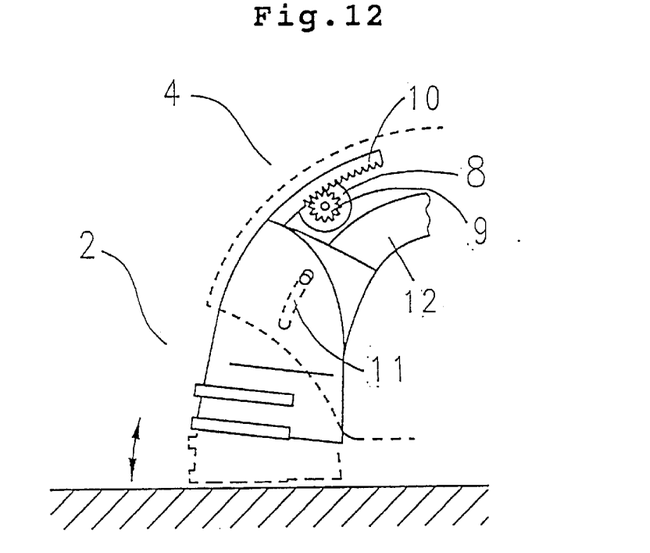
FIG. 12 is a partial cross-sectional view showing the lifting mechanism of the embodiment of FIG. 5.

FIG. 12 is a partial cross-sectional view showing lifting mechanism 4 of collecting unit 2 explained with reference to FIG. 5. When motor 8 located on the main unit of the robot is driven, pinion 9 that is attached to the output shaft of this motor 8 rotates. Rack 10 that engages with pinion 9 is located at an upper area of collecting unit 2. Through the rotation of pinion 9, collecting unit 2 becomes lifted along guide 11. The part shown in FIG. 12 connecting the suction opening 2A to a source of suction comprises a flexible and expandable tubular member which stretches and shrinks as collecting unit 2 is lifted and lowered.

Lifting mechanism 4 of wiping unit 3 also lifts and lowers wiping unit 3 using the same mechanism.

Figure 13:
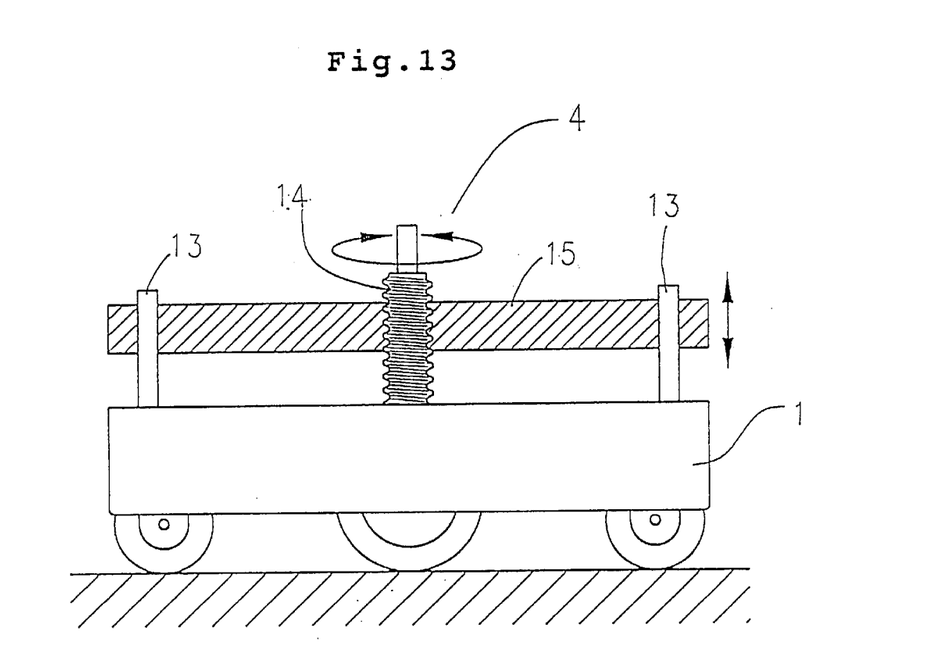
FIG. 13 is a partial cross-sectional view showing the lifting mechanism of the embodiment of FIG. 6.

FIG. 13 is a partial cross-sectional view showing lifting mechanism 4 of a robot in which collecting unit 2 and wiping unit 3 explained with reference to FIG. 6 are linked together.

A screw 14 having trapezoidal threads is rotatably mounted on moving means 1. Lifting guides 13 are mounted at two or more positions on moving means 1 as well. Lifting board 15 is located such that it engages with screw 14, and collecting unit 2 and wiping unit 3 are attached to this lifting board 15. When the screw 14 is caused to rotate by a motor, etc., lifting board 15 that is engaged with screw 14 moves up or down along lifting guides 13. Through this operation, the lifting and lowering of collecting unit 2 and wiping unit 3 is performed in a united fashion as shown in FIG. 6.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A working robot comprising:

a main unit;

a moving unit which moves said main unit on a floor in a moving direction;

a collecting unit which is disposed at a front of the moving unit with respect to the moving direction of the main unit and collects dust on the floor;

a wiping unit which is disposed at a rear of the moving unit with respect to the moving direction of the main unit and cleans the floor; and wherein said wiping unit has a width in a direction transverse to the moving direction, said moving unit has a width in a direction transverse to the moving direction, and said collecting unit has a width in a direction transverse to the moving direction, wherein the wiping unit width is larger than the moving unit width, and the collecting unit width is approximately equal to or larger than the width of said wiping unit.

2. A working robot comprising:

a main unit;

a moving unit which moves said main unit on a floor in a moving direction;

a collecting unit which is disposed at a front of the moving unit with respect to the moving direction of the main unit and collects dust on the floor;

a wiping unit which is disposed at a rear of the moving unit with respect to the moving direction of the main unit and cleans the floor; and a lifting mechanism including a first lifting member which raises and lowers the collecting unit and a second lifting member which raises and lowers the wiping unit.

3. A working robot as claimed in claim 2 wherein the first lifting member and the second lifting member are integrally formed.

4. A working robot comprising:

a main unit;

a moving unit which moves said main unit on a floor in a moving direction;

a collecting unit which is disposed at a front of the moving unit with respect to the moving direction of the main unit and collects dust on the floor;

a wiping unit which is disposed at a rear of the moving unit with respect to the moving direction; and wherein each of the collecting unit and the wiping unit is provided with an upper sensor and a lower sensor for detecting an obstacle during movement of the main unit.

5. A working robot as claim in claim 4 wherein the upper and lower sensors provided at the collecting unit and the wiping unit are contact sensors.

6. A working robot as claim in claim 4 wherein the upper sensor and the lower sensor of the collecting unit and the upper sensor of the wiping unit each include a light emitting portion and a light receiving portion.

7. A working robot as claim in claim 4 wherein the upper sensor and the lower sensor of the collecting unit and the upper sensor of the wiping unit each include a passive auto focus sensor.

8. A working robot comprising:

a main unit;

a moving unit which moves said main unit on a floor in a moving direction;

a collecting unit which is disposed at a front of the moving unit with respect to the moving direction of the main unit and collects dust on the floor;

a wiping unit which is disposed at a rear of the moving unit with respect to the moving direction; and said moving unit includes a pair of driving wheels having axes disposed perpendicular to the moving direction of the main unit.

9. A working robot as claim in claim 8 wherein said moving unit includes a pair of guiding wheels disposed between said driving wheels and the guiding wheels having axes disposed perpendicular to the moving direction of the main unit.

10. A working robot comprising:

a main unit;

a moving unit which moves said main unit on a floor in a moving direction;

a collecting unit which is disposed at a front of the moving unit with respect to the moving direction of the main unit and collects dust on the floor;

a wiping unit which is disposed at a rear of the moving unit with respect to the moving direction; and wherein said moving unit includes a pair of crawlers disposed parallel to the moving direction of the main unit.

11. A working robot as claim in claim 10 wherein said moving unit includes an orientation changing mechanism placed in the center and at the bottom of the main unit, said orientation changing mechanism lifting the main unit to a predetermined height when the robot turns so that the crawlers are lifted away from the floor.

12. A working robot comprising:

a main unit;

a moving unit which moves said main unit on a floor in a moving direction;

a first working unit which is disposed at the front of the moving unit with respect to the moving direction of the main unit and performs a first cleaning operation; and a second working unit which is disposed at the rear of the moving unit with respect to the moving direction of the main unit and performs a second cleaning operation wherein said second working unit has a width in a direction transverse to the moving direction, said moving unit has a width in a direction transverse to the moving direction, and said first working unit has a width in a direction transverse to the moving direction, wherein the second working unit width is larger than the moving unit width, and the first working unit width is approximately equal to or larger than the width of said second working unit.

13. A working robot as claimed in claim 12 wherein said first working unit includes a suction inlet for suctioning dust on the floor.

14. A working robot as claimed in claim 12 wherein said second working unit includes a plurality of rotatable members for wiping the floor.

15. A working robot as claimed in claim 14 wherein each of the rotatable members includes a hole formed in the center thereof, for dispensing the fluid which is dropped through each hole onto the floor.

16. A working robot as claimed in claim 15 wherein said fluid includes a cleaning solution or a wax solution.

17. A working robot as claimed in claim 12 further comprising:

a lifting mechanism including a first lifting member which raises and lowers the first working unit and a second lifting member which raises and lowers the second working unit.

18. A working robot as claimed in claim 17 wherein each of the first working unit and the second working unit has an upper sensor and a lower sensor for detecting an obstacle during movement of the main unit, and the lifting mechanism operates when the lower sensor of the first working unit or the second working unit detects an obstacle and the upper sensors do not detect an obstacle.

19. A self-guided working robot comprising:

a main unit;

a moving unit which moves said main unit on a floor in a moving direction;

a first working unit which is disposed at the front of the moving unit with respect to the moving direction of the main unit and performs a first cleaning operation; and a second working unit which is disposed at the rear of the moving unit with respect to the moving direction of the main unit and performs a second cleaning operation, the second working unit including a plurality of rotatable members for wiping the floor and a dispensing mechanism for dispensing a fluid.

* * * * *